Feb. 9, 1932.     R. W. EDWARDS ET AL     1,844,568
MEANS FOR CONVERTING CONTINUOUS ROTARY MOTION
INTO REVERSIBLE LINEAR MOTION
Filed May 7, 1929     3 Sheets-Sheet 1

Inventors
Robert William Edwards
John Dykes Young and
Samuel Dykes Young
By R. Hinge, Atty.

Feb. 9, 1932.     R. W. EDWARDS ET AL     1,844,568
MEANS FOR CONVERTING CONTINUOUS ROTARY MOTION
INTO REVERSIBLE LINEAR MOTION
Filed May 7, 1929     3 Sheets-Sheet 2

Feb. 9, 1932.  R. W. EDWARDS ET AL  1,844,568
MEANS FOR CONVERTING CONTINUOUS ROTARY MOTION
INTO REVERSIBLE LINEAR MOTION
Filed May 7, 1929   3 Sheets-Sheet 3

Patented Feb. 9, 1932

1,844,568

UNITED STATES PATENT OFFICE

ROBERT WILLIAM EDWARDS, JOHN DYKES YOUNG, AND SAMUEL DYKES YOUNG, OF AYR, AUSTRALIA

MEANS FOR CONVERTING CONTINUOUS ROTARY MOTION INTO REVERSIBLE LINEAR MOTION

Application filed May 7, 1929, Serial No. 361,170, and in Australia May 7, 1928.

The conversion of rotary motion into linear motion and even into reciprocating linear motion may and has been effected by various mechanisms, but the present invention it is believed possesses features not hitherto known inasmuch as without variation of direction of the rotary motion and irrespectively of the speed of the latter, without engagement or disengagement of any gear wheels, the linear motion may be nil, or may be caused to take effect in either of two opposite directions as desired and to a minimum extent or to the maximum extent permitted by the mechanism and continuously or in progressive stages as required or desired.

A slipping clutch drive constitutes an essential element in the mechanism and affords a particularly sensitive control.

Having these particular features the mechanism is adapted for a variety of purposes involving the conversion of rotary to controlled and governed linear motion in either direction, and particularly in cases where resistance to the linear movement is considerable and the power of a prime mover is available. An example of such an application of the mechanism is the steering of a motor-driven vehicle such as a tractor, in which case the power of the motor, taken from the rotating crank shaft, in addition to its normal function of driving the vehicle, is converted to linear motion which is communicated to the arms or levers of the steering knuckles, or applied to the angular setting of the axle.

The invention consists in mechanism including a screwed sleeve threaded upon a screwed shaft, one of these elements being fixed and the other rotatable, and two clutches selectively operated to rotate the sleeve in reverse directions with consequent relative linear movement of the sleeve and shaft in one direction or the other, one element of each of said clutches being geared, reversely to the corresponding element of the other, to a power driven shaft.

The invention also consists in mechanism including essentially a power-driven rotating shaft restrained against lengthwise movement, a screw-threaded fixed shaft, a threaded sleeve on said screwed shaft, a pair of clutch elements mounted one on either end of said sleeve and freely rotatable thereon, a pair of complementary clutch elements to alternatively and respectively engage the other clutch elements and clutch either of them, but not both at one time, to the sleeve, means for effecting the engagement and disengagement of the clutch elements, and gearing between the power driven shaft and the first mentioned pair of clutch elements to rotate them in opposite directions so that when the clutch elements at one end are engaged the sleeve will rotate in one direction on the screwed shaft and consequently also move in linear motion thereon, but if the clutch elements at the other end are engaged reverse rotary and linear motion will result, while if neither clutch is engaged no motion of the sleeve will occur.

In the last mentioned construction the power driven shaft is either square or splined and the transmitting gear wheel thereon is free to move axially upon it as the sleeve moves on the screwed shaft. The intermediate gears between that on the power shaft and those on the first mentioned clutch elements are carried by a yoke or collar within which the screwed sleeve rotates but is not movable axially, said collar being secured to a frame or carriage mounted in guides parallel with the screwed shaft. This carriage consequently has linear motion synchronizing with that of the sleeve, and this motion is communicated to the particular mechanism which it is desired to actuate.

In the application of the mechanism to the particular purpose of steering a motor-vehicle, the power driven shaft is geared directly or indirectly to the motor, the travelling carriage or frame suitably coupled to the arms or levers of the steering knuckles, and the means for actuating the clutches coupled to the steering wheel.

In practice the mechanism is housed in a casing providing an oil bath, and in which the screwed shaft is fixed, the power driven shaft has bearings (one end projecting through the casing) and the guides for the carriage are fitted, and through which a rod or rods connected to the carriage project for the purpose of coupling the latter to the steering knuckle levers.

The invention also consists in other details of construction as hereinafter described with reference to the accompanying drawings which depict mechanism according to this invention, it being understood that the invention is not confined to the construction described and illustrated as it includes any modifications falling within the scope of the appended claims.

Figure 2:
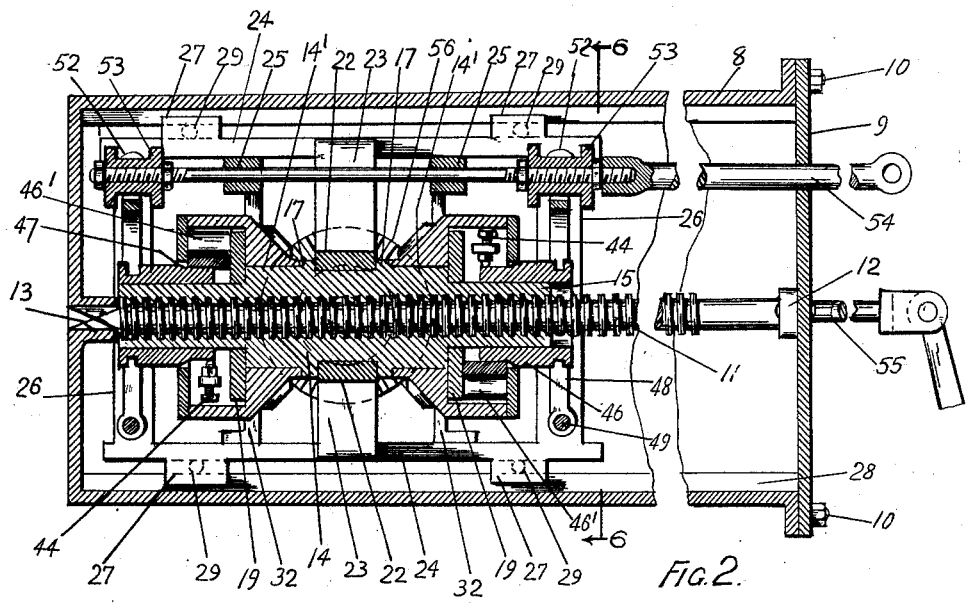
Figure 5:
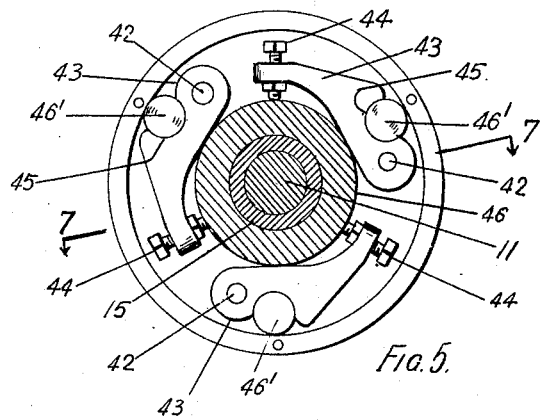
Figure 6:
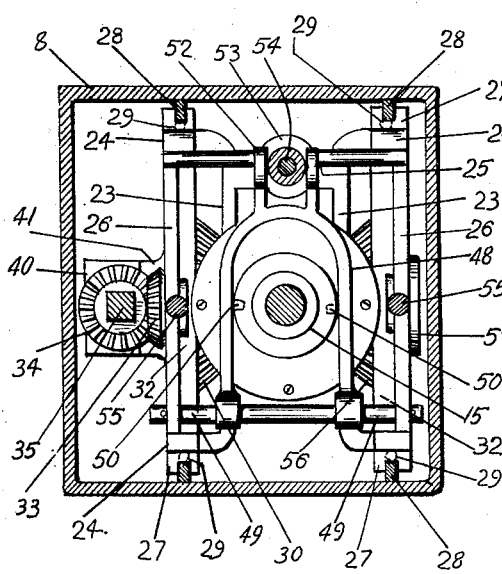
Figure 7:
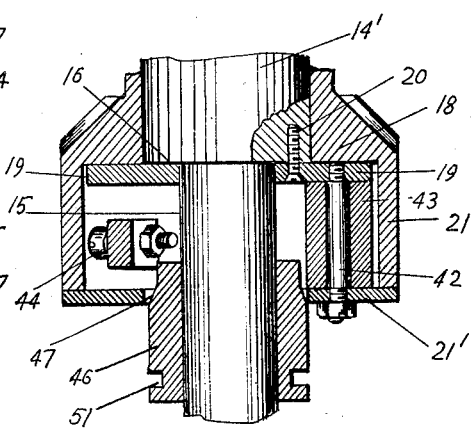

Fig. 5 an end elevation of the same;

Fig. 6 is a sectional end elevation of the mechanism on the plane 6.6 of Fig. 2, and Fig. 7 is a fragmentary sectional plan on line 7.7 of Fig. 5.

Similar reference characters designate corresponding parts throughout the figures.

Referring to the drawings, the mechanism is housed in an oil-bath casing 8 of rectangular shape having a detachable end plate 9 secured by set screws 10 to the casing. A square-threaded shaft 11 is immovably secured to the inner surface of the ends of the casing by means of a foot 12 at one end which is riveted to the end plate 9 and a square 13 at the other end which fits into a square recess formed in the other end of the casing, the shaft being slightly offset from the centre of the said casing ends.

Threaded on to shaft 11 is a screwed sleeve designated generally by reference numeral 14 having cylindrical end portions 15.15, the diameter of the sleeve being centrally increased or "stepped up" with the formation of shoulders 16.16 (Figs. 2 and 7) and a central cylindrical portion 14¹, upon which are formed external spaced collars 17.17 equidistant from the centre of the sleeve.

Rotatably mounted upon either end of the portion 14¹ of sleeve 14 are two oppositely disposed bevel gear wheels 18.18 the inner shoulders of which butt against the collars 17.17 the wheels being retained upon the sleeve by ring plates 19.19 which are passed over portions 15.15 of the sleeve and respectively are held against shoulders 16.16 by means of set screws 20 (Fig. 7), the bevel gear being freely rotatable between the collars 17 and the plates 19.

Upon the back surface of each bevel gear 18 is a drum 21, formed either integrally with or secured to the bevel gear and which overhangs the plate 19. The end of the drum is fitted with a ring cover plate 21¹.

A detachable split yoke 22 (Figs. 2 and 3) rotatably engages the sleeve between the collars 17.17 and is secured by means of side members 23.23 to the longitudinal members 24 of a rectangular frame which also includes cross bracing bars 25, vertical corner posts 26 and guide blocks 27 upon which the frame slides upon rails 28 in the top and bottom of the casing 8, a ball 29 being inserted in each guide block to reduce friction.

Thus it will be seen that the sleeve is capable of screwing movement upon the fixed screwed shaft 11, such movement resulting in rotary and linear movement of sleeve and a resultant linear movement of the coupled frame upon the rails, the direction of such latter movement depending upon the direction of rotation of the sleeve.

The bevel gear 18.18 mesh with and are driven by a bevel wheel 30 mounted upon the inner end of a short transverse shaft 31 rotatably carried in a bearing formed in a side bracket 32 secured to the upper and lower members 24 on one side of the frame, an outwardly facing bevel wheel 33 being mounted upon the other end of this shaft exterior to the frame.

Bevel gear 33 meshes with and is driven by a bevel 34 which slides upon a square driven shaft 35 which has bearing surfaces formed upon its ends where it is rotatably mounted in the ends of the casing in bearings 36 and 37.

Figure 1:
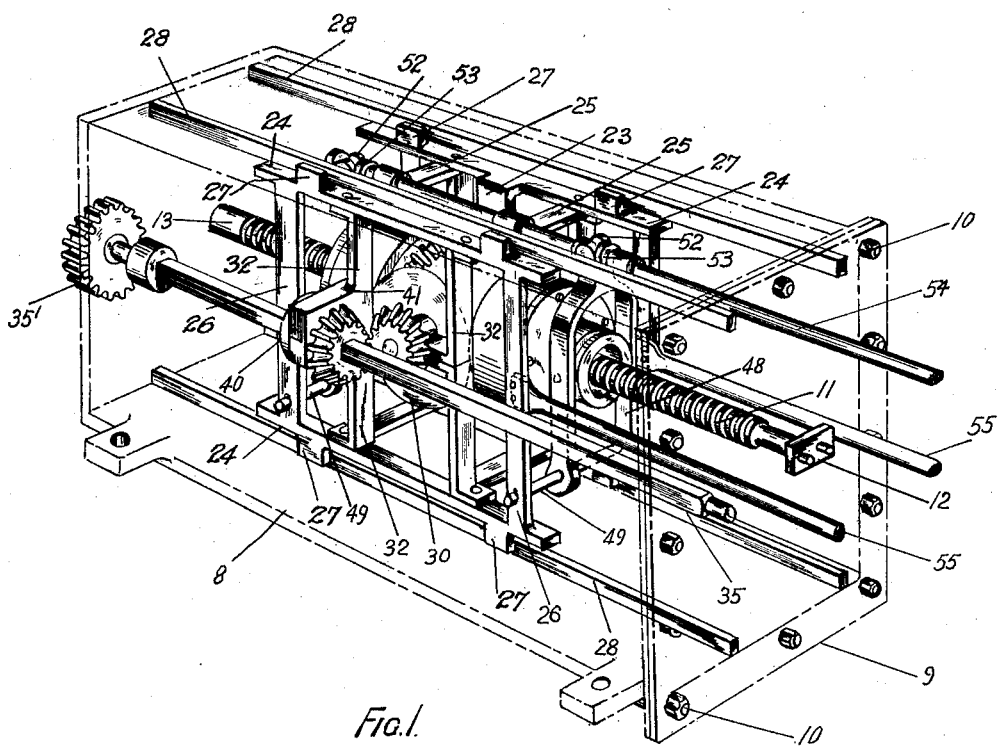
Fig. 1 is a perspective view of the mechanism with the containing case shown in dotted lines, Fig. 2 a longitudinal sectional elevation, and Fig. 3 a sectional plan view.

In order to mesh bevels 33 and 34 irrespectively of the position of the frame within casing 8, the latter bevel gear is formed with a sleeve 38 having a collar 39, this sleeve fitting in a bearing 40 formed upon a member 41 secured to the moving frame, so that the bevel gear moves with the frame and constantly meshes with bevel gear 33 while being driven by shaft 35, the latter being driven by a sprocket or the like 35¹ (Fig. 1) fitted to it exteriorly of the casing and connected to a continuously rotating shaft such as the crankshaft of an engine.

Shaft 35 continuously rotates and bevel gear 34 mounted upon it continuously drives bevel gear 30, through bevel gear 33, which in turn continuously drives bevel gears 18.18 in opposite directions, the later normally rotating freely upon the sleeve 14.

In order to cause the sleeve 14 to rotate and move along the shaft 11 it is engaged to one or other of the rotating bevel gears 18.18 depending upon the direction in which motion is desired, the engagement being effected by a clutch located within the drum 21 secured to bevel gear 18. The clutch in each of the two drums 21 is identical and will therefore be described in reference to one drum only, it being remembered that the description applies to each clutch.

As shown in Figs. 5 and 7 three bearing studs 42 are tapped into plate 19, nuts on their outer ends holding the cover plate 21¹ in position. These studs are equally spaced around a pitch circle and each stud forms a pivot for one end of one of three rockers or levers 43, the free ends of which are each fitted with an adjusting set screw 44. Located between the ends of each rocker but nearer the pivotal point and on the outer surface thereof is a semicircular recess 45 which forms a seating for a roller 46¹ projecting beyond the outer surface of the rocker and arranged to contact with the inner surface of drum 21 when the free end of the rocker is forced outwardly.

Such spreading of the ends of the rockers is effected by a sleeve 46, having a cone surface 47 formed upon it, which is slidably mounted upon the portion 15 of sleeve 14 and passes through the central aperture of the cover plate 21¹. When this cone-sleeve 46 is forced inwardly (from the position shown in Fig. 7) the inner ends of set screws 44 ride up the cone surface 47, spreading the rockers 43 and forcing rollers 46¹ into contact with the drum, thus clutching the drum (and the bevel gear with which it is connected) to the rockers and hence to the sleeve 14 through the plate 19, so that sleeve 14 is caused to rotate with the bevel gear under consideration and thus to screw along fixed shaft 11, transmitting its linear motion to the moving frame which it carries with it.

If one of the bevel gears 18 is clutched to the sleeve 14 as above described, the latter will move along shaft 11 in one direction, but if the other bevel gear 18 is similarly engaged the sleeve will move along the shaft in the opposite direction owing to the opposite direction of rotation of this latter bevel gear.

Figure 3:
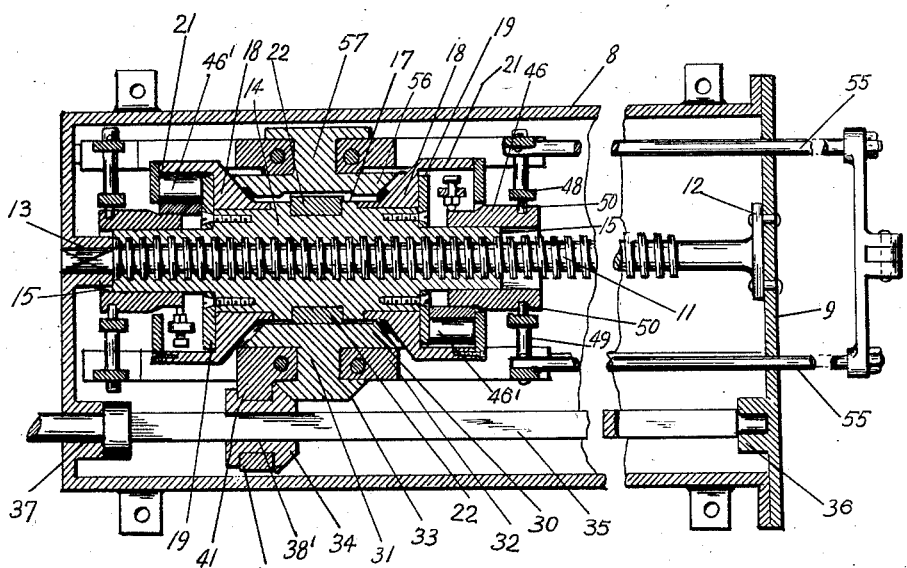
Figure 4:
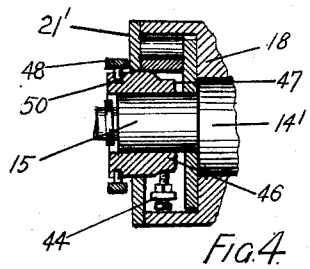
Fig. 4 is a sectional view of a clutch in the engaged position.

It is to be understood that the cone-sleeve on either end of sleeve 14 is inwardly directed and the cone sleeves are therefore oppositely disposed, as clearly shown in Figs. 2 and 3.

In order to move the cone-sleeve into the engaged position a forked lever 48 is employed, the fork ends thereof being pivoted as at 49 to the lower members 24 of the moving frame, two inwardly projecting lugs 50 being provided on the legs of the fork to engage an annular recess 51 provided in the outer end of cone-sleeve 46. The upper end of the fork lever is formed with a small fork having upwardly directed legs 52.

It will be seen that movement of the upper end of either fork lever 48 towards its clutch will cause the cone-sleeve connected to it to move inwardly and clutch the bevel gear and sleeve as above described.

As clearly shown in Fig. 2 the upper legs 52 of each fork-lever are located between a pair of collars 53 adjustably secured to a horizontal control rod 54, one end of which projects through the end 9 of casing 8.

Shaft 54 has the collars 53 so arranged upon it that when the control rod is in a mid or neutral position neither clutch is engaged, but if the rod is drawn to the right from the position shown in Fig. 2 the cone-sleeve of the clutch on the left hand end of this figure is forced inwardly causing this clutch to engage and the sleeve 14 to move along the shaft 11 carrying with it the moving frame. It is to be noticed that the cone-sleeve on the right hand clutch is drawn away from the latter by the said movement of rod 54 and the sleeve 14 and the moving frame are tending to move away from the engaged cone-sleeve, so that immediately the pressure on the control rod is released the sleeve and frame move out of engagement with the cone-sleeve and linear motion ceases; it is therefore impossible for the mechanism to "run into" and bind the engaged clutch, in fact the tendency is the antithesis of this, as the mechanism tends to "run away" from the clutch and a following pressure upon the control rod must be sustained in order to maintain the linear translation of the frame, and a fine degree of control consequently results. To effect reverse movement of the sleeve and frame the pressure on the control rod is reversed and the clutch at the right hand end of Fig. 2 is engaged and the frame moves in reverse direction. It is to be noted that the pressure upon the control rod is very light, in fact just sufficient to effect the spreading of levers 43 sufficiently to bind the drum and the rollers as above described.

The linear movement or thrusting motion of the moving frame is transmitted to any outside mechanism by means of two push rods 55 rigidly secured to the corner posts of the moving frame and projecting through the end plate 9 of the casing 8.

As shown in Fig. 3, an idler bevel wheel 56 is disposed opposite to the driving bevel 30 and meshes with the two bevel gears 18.18, being mounted upon a short shaft 57 carried in brackets similar to brackets 32 but on the opposite side of the frame. This idler bevel gear serves to even the drive and torque applied to the bevels 18.18.

From the foregoing description it will be readily understood that the continuous rotary motion of power-driven shaft 35 and of any rotating element from which it derives motion, may be translated to regulated and selected linear movement of the sleeve 14 upon screwed shaft 11 with consequential and equivalent movement of the frame and the push rods 55, and that the movement of the latter may be applied to any appropriate purpose.

What we claim and desire to secure by Letters Patent is:—

1. In mechanism for converting rotary to reciprocable linear motion including a driven rotary shaft, a screwed shaft restrained against rotary motion and a screwed sleeve threaded on said screwed shaft, clutching means comprising two separate clutch elements freely mounted to rotate concentrically with but irrespectively of said sleeve and geared to said rotary shaft to rotate respectively in opposite directions, complementary clutch elements to engage respectively the first mentioned clutch elements and clutch them to the sleeve, and means for selectively effecting engagement of one pair of clutch elements and consequential disengagement of the other pair to effect rotary motion of the sleeve in selected direction on the shaft and resultant linear motion of one in relation to the other.

2. In mechanism for converting rotary to linear motion, the construction according to claim 1 hereof, further characterized in that the clutch elements reversely geared to the driven rotary shaft are mounted to rotate freely upon the said sleeve.

3. In mechanism for converting rotary to linear motion, the construction according to claim 1 hereof in which the screwed sleeve is rotatably mounted in a frame capable of linear movement in guides.

4. In mechanism for converting rotary to linear motion, the construction according to claim 1 hereof, in which the screwed sleeve is rotatably mounted in a frame capable of linear movement in guides mounted in a casing enclosing the mechanism.

5. In mechanism for converting rotary to linear motion, the construction according to claim 1 hereof, in which the clutch elements reversely geared to the driven rotary shaft are mounted to rotate freely upon the opposite ends of the said rotating sleeve, each clutch comprising a hollow drum having a gear wheel at one end, within the drum a set of pivoted arms secured to the sleeve and each carrying a roller normally retracted from but movable into frictional contact with the inner periphery of the drum, and an element of tapered form movable axially in relation to the sleeve to force said rollers into contact with, or permit them to retract from, said drum.

6. In mechanism for converting rotary to reciprocable linear motion including a driven rotary shaft, a screwed shaft restrained against rotary motion and a screwed sleeve threaded on said screwed shaft, clutching means comprising two separate clutch elements each comprising a hollow drum having a gear wheel at one end and freely mounted to rotate respectively upon the opposite ends of said sleeve and geared to said rotary shaft to be rotated thereby respectively in opposite directions, within each drum a complementary clutch element, to engage the first mentioned clutch element and clutch it to the sleeve, each complementary element comprising a set of arms pivoted to said sleeve and each carrying a roller normally retracted from but movable into frictional contact with the inner periphery of said drum and an element of tapered form movable axially in relation to the sleeve to force said rollers into contact with or permit them to retract from said drum, in combination with means for selectively effecting engagement of either pair of complementary clutch members and consequential disengagement of the other pair, said means comprising two levers each pivoted at one end to a frame in which the sleeve is mounted, and each engaging one of said tapered elements to move same axially, and means for actuating said levers to move either tapered element into clutching position and simultaneously move the other from the clutching position.

7. In mechanism for converting rotary to reciprocable linear motion, the construction according to claim 6 in which the lever actuating means consists of an axially movable rod engaging the ends of both levers remote from their pivots.

8. In mechanism for converting rotary to reciprocable linear motion, the construction according to claim 6 hereof in which the screwed sleeve is rotatably mounted in a frame capable of linear movement in guides mounted in a casing enclosing the mechanism.

9. In mechanism for converting rotary to reciprocable linear motion, the construction according to claim 6 hereof in which the gear wheels, which are bevel gears, are opposed and mutually mesh with a third bevel wheel geared to the driven shaft, and in which the roller-carrying arms of each clutch are pivoted to a flange plate secured to the sleeve.

10. In mechanism for converting rotary to reciprocable linear motion, the construction according to claim 6 hereof in which the gear wheel on the driven shaft is slidable but not rotatable thereon.

Signed at Sydney this twenty second day of March, A. D. 1929.

ROBERT WILLIAM EDWARDS.

Signed at Townsville, Queensland, this twenty-seventh day of March, A. D. 1929.

JOHN DYKES YOUNG.
SAMUEL DYKES YOUNG.